INVENTOR.
HERBERT J. MOLONEY

ATTORNEY

Dec. 1, 1964    H. J. MOLONEY    3,159,474
SALT WATER CONVERSION PLANTS
Filed May 21, 1962    6 Sheets-Sheet 2

INVENTOR.
HERBERT J. MOLONEY
BY
ATTORNEY

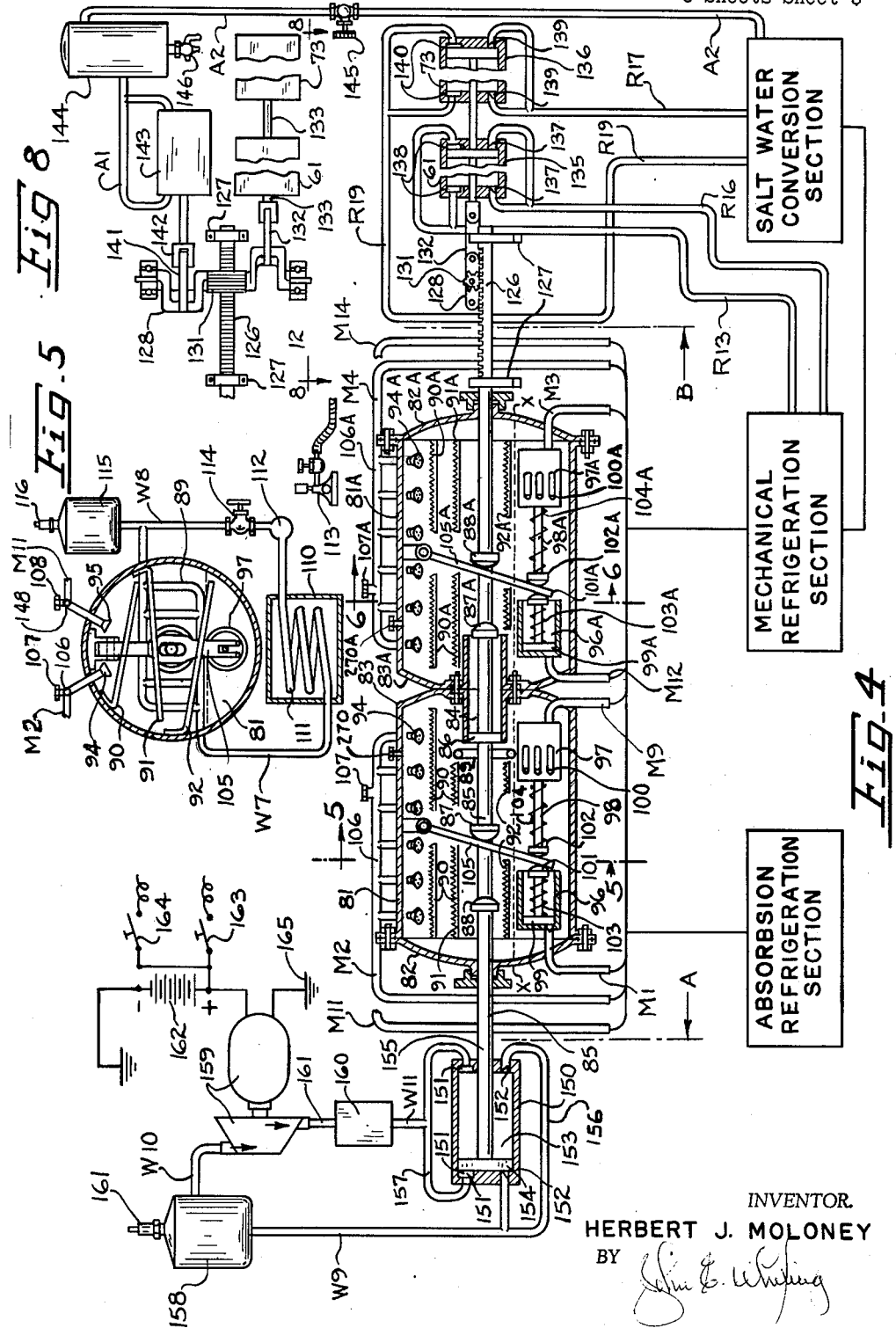

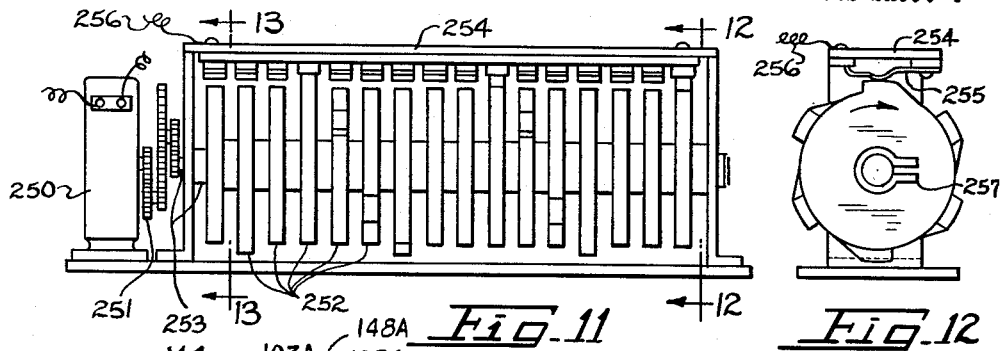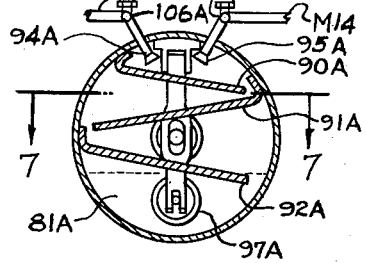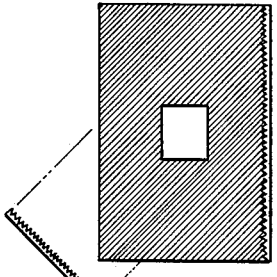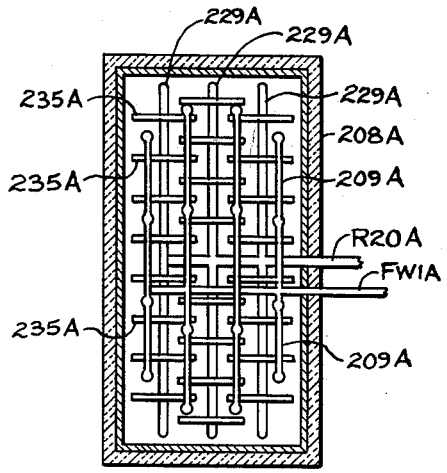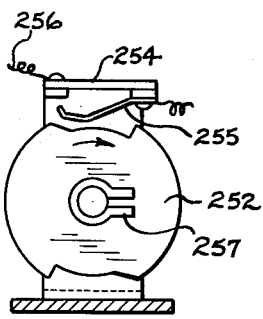

Dec. 1, 1964  H. J. MOLONEY  3,159,474
SALT WATER CONVERSION PLANTS
Filed May 21, 1962  6 Sheets-Sheet 5

INVENTOR.
HERBERT J. MOLONEY
BY
ATTORNEY

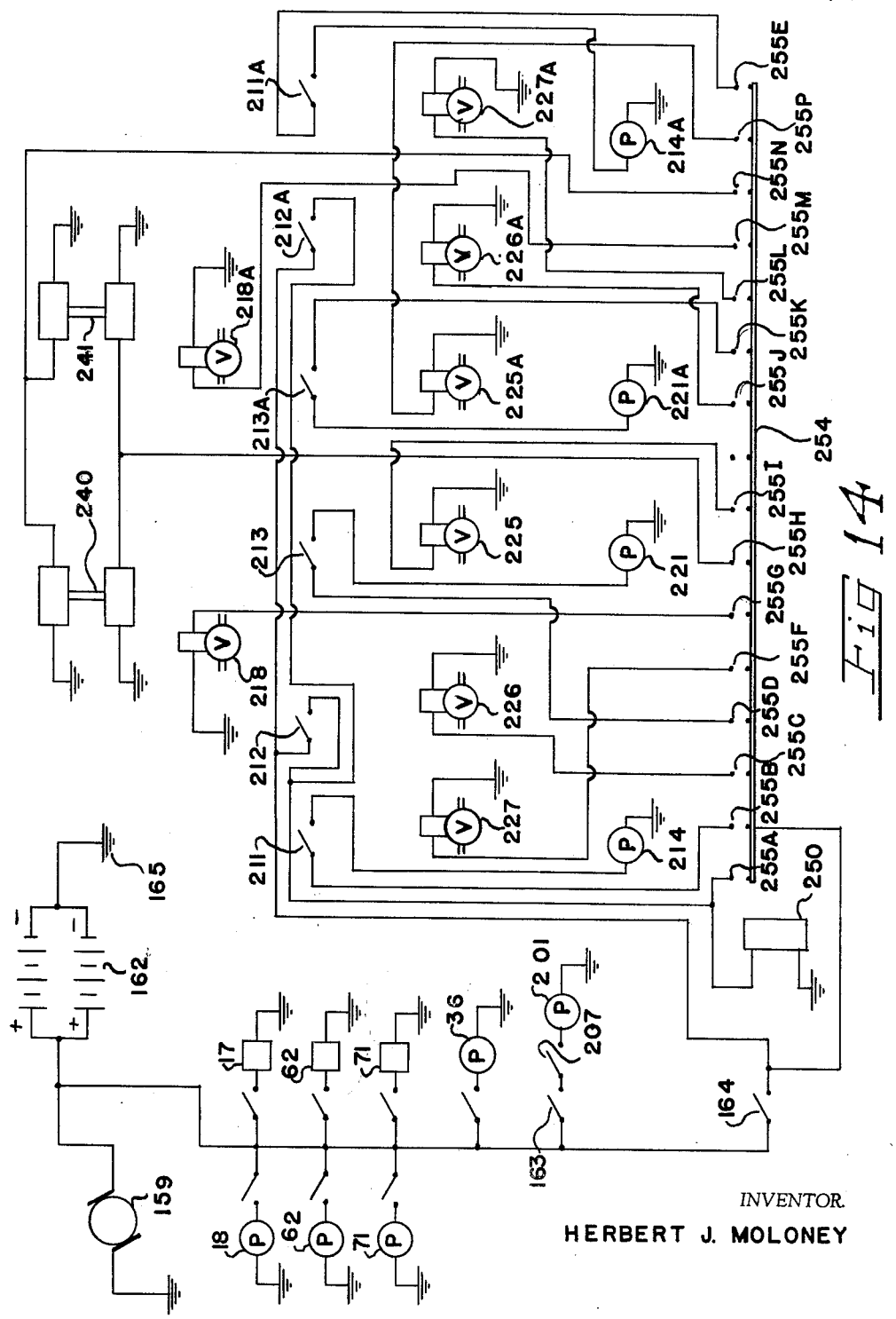

United States Patent Office 3,159,474
Patented Dec. 1, 1964

3,159,474
SALT WATER CONVERSION PLANTS
Herbert J. Moloney, 3020 Oak Knoll Drive,
Redwood City, Calif.
Filed May 21, 1962, Ser. No. 196,137
18 Claims. (Cl. 62—58)

This invention relates to a new and useful improvement in salt water conversion plants and the method for the conversion of salt water; particularly this invention relates to such means and method for the conversion of salt water or brackish water which incorporates as a source of power the method and means of that certain power generating device described and claimed under United States Letters Patent 2,979,888, issued on April 18, 1961.

One of the principal obstacles in the economic conversion of salt or brackish water to fresh water has been the high cost of power which present day systems utilize. Therefore, in order to reduce this cost factor, it is necessary to devise a plant which, among other features, utilizes the new and useful means of generating power; such a means is described and claimed in the aforementioned Letters Patent which is by this reference incorporated herein.

By way of general description, this means and method for the generation of power, captures and converts into mechanical energy those forces which result when a liquid changes state to a solid; thus as described in the patent referred to, a liquid is confined within a limited volume where its temperature is reduced to a point below its fusion temperature while its expansion is restrained to prevent it from entering the solid state. As the temperature of the liquid is reduced under such an environment, the expansional forces exerted by it are converted into mechanical work energy. A device such as that described in the patent referred to is thus able to accomplish considerable work at an extremely low cost, and by the incorporation of a device of this nature into a new and improved salt water conversion apparatus, fresh water can be derived at an extremely low cost.

Therefore, one of the principal objects of this invention is to provide an efficient method and means for the conversion of salt or brackish water into fresh water by the economic and efficient control of low level heat energy and the transformation thereof into mechanical energy.

Another object of this invention is to provide a method and means for salt water conversion which can be effectively operated either by solar energy or heat energy derived from the combustion of conventional fuels or from other conventional energy sources.

Another object of this invention is to provide a means and method for salt water conversion which is simple and self contained and at the same time is able to efficiently convert low level heat energy into mechanical energy.

Another object of this invention is to provide a method and means for the conversion of salt water of the character described which is capable of storing solar energy in the form of ice for use in furnishing refrigeration to the salt water conversion plant and its power generating device during periods when solar energy is not directly available. In other words, a salt water conversion plant wherein positive energy in the form of solar or other heat is indirectly converted into ice in which form it is stored so that it may provide the apparatus with an adequate source of refrigeration for operation.

Another object of this invention is to provide a method of and means for salt water conversion of the character described which is capable of utilizing the low level heat energy derived from the air, a body of water, or the earth.

Another object of this invention is to provide a method and means for salt water conversion by using mercury as the medium for transferring positive and negative low level heat energy, above and below zero C. from section to section in plant.

Another object of this invention is to provide a method and means for the conversion of salt water wherein an economical and efficient apparatus is utilized to freeze the salt and other impurities out of the salt water.

Another object of this invention is to provide a means for salt water conversion of the character described which may be operated by the low level heat energy supplied by the condenser coil of an operating mechanical refrigerator.

These and further objects of this invention will become obvious upon reading the foregoing specification in which the accompanying drawings form a part and wherein like numerals are used to designate like parts throughout the same, and in which:

FIGURE 4 is a longitudinal sectional view of the power generating device, its transmission system, and the hydro-electric generator, which are all schematically shown in relation to the absorption refrigerator, the mechanical refrigerator, the salt water conversion section and the hydroelectric plant.

FIGURE 5 is a sectional view of the power generating device taken along the broken line 5.

FIGURE 6 is a sectional view of the power generating device taken along the broken line 6.

FIGURE 7 is a top enlarged view of a baffle plate in the power generating device along the line 7 in FIGURE 6.

FIGURE 7A is an end view of the baffle plate shown in FIGURE 7.

FIGURE 8 is a top view of the transmission system of the power generating device taken along the broken line 8—8 shown in relation to air and refrigerant compressors.

FIGURE 10 is a top sectional view of a freezing tank of the salt water conversion section of the plant taken along the line 10 shown in FIGURE 9.

FIGURE 11 is a longitudinal sectional view of the timing device with a side view of its motor and gear train.

FIGURE 12 is a cross sectional view of the timing device along the line 12 in FIGURE 11.

FIGURE 13 is a cross sectional view of the timing device along the line 13 in FIGURE 11. FIG. 14 is a schematic drawing of the entire electrical circuits of the salt water conversion plant.

Figure 1:
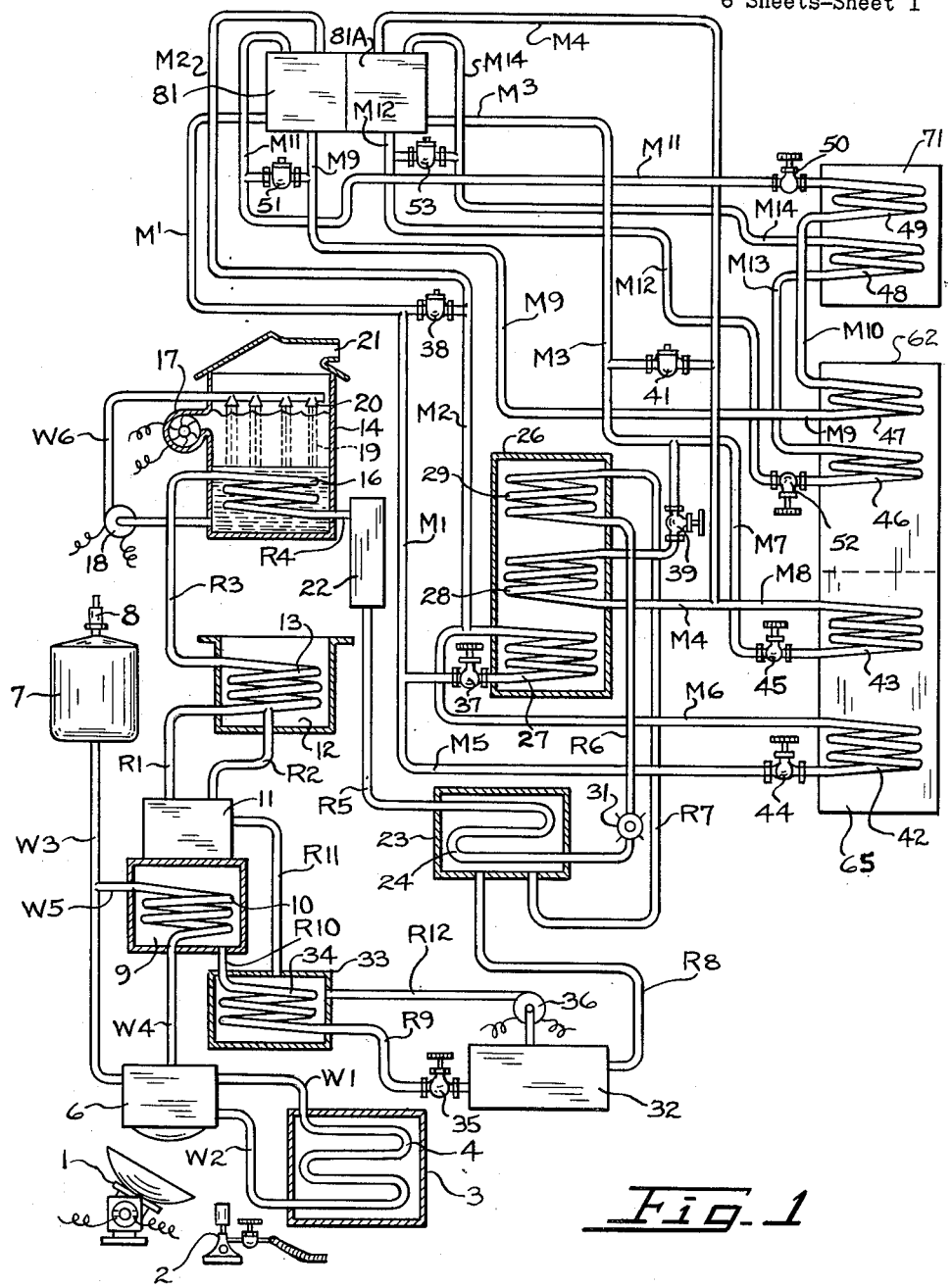
FIGURE 1 is a schematic view of the absorption refrigerator showing its heating and cooling circuits in relation to the power generating device, the mechanical ice storage plant, and the salt water conversion section.

In the drawings the various conduits are designated by letter symbols to show the substance contained therein, i.e., water "W"; mercury "M"; salt water "SW"; fresh water "FW"; air "A."

The salt water conversion plant which is my invention is devised of seven principal units: (1) the absorption refrigerator, (2) the mechanical refrigerator ice storage section, (3) the power generating device, (4) the mechanical transmission system, (5) the hydro-electric generator, (6) the timer and (7) the salt water conversion section.

Generally, the function and interaction of these sections can be described as follows: The absorption refrigerator serves to reduce the temperature and maintain the sub-zero environment of the contents of the power generating device. It also furnishes refrigeration to condenser coil of the mechanical refrigerator. The mechanical refrigerator manufactures and stores ice and supplies liquid contents of the power generating device with required heat from condenser coil, and during periods when the absorption refrigerator is turned off or is incapable of operation. The mechanical refrigerator and stored ice serves to also heat and cool the liquid contents of the power generating device. The power necessary to operate both the mechanical refrigerators, the air pump and salt water conversion section is generated in the power generating device and is transmitted therefrom by means of the transmission section. The hydro-electric generator is also supplied with mechanical energy by the power generating device and it serves to supply electrical energy to the salt water conversion section as well as water coolers, pumps, and the timer which functions to automatically operate parts of the salt water conversion section.

*The absorption refrigerator.*—In the absorption refrigerator shown in the drawing, FIG. 1, the numeral 1 depicts an equatorial mounted solar heat concentrator, whereas alternative means of supplying heat energy to the absorption refrigerator is designated by the numeral 2 which is a conventional gas burner; the numeral 3 shows another heat supply, a flat plate solar heat collector, containing copper coil 4.

The numeral 6 indicates a hot water boiler which is interconnected with the top end of the coil 4 of heat collector 3 by means of the conduit W1. The numeral W2 shows a conduit extending between coil 4 and the base of the boiler 6. An expansion tank 7 equipped with pressure relief valve 8 is connected to the water boiler 6 by the conduit W3.

The numeral 9 designates an absorption refrigerator generator containing heating coil 10 with its bottom end connected to the water boiler 6 by the conduit W4 and its upper end connected to conduit W3 by conduit W5. An analyzer 11 is mounted on and intercommunicates with the generator 9. Numeral 12 is a cooling tank having within it rectifier coil 13, one end of which is connected to the analyzer 11 by conduit R1. A second conduit R2 extends between coil 13 and analyzer 11.

The numeral 14 depicts a water cooling tower having within it a condensing coil 16 with its upper end connected to the rectifier coil 13 by the conduit R3. A motor driven air blower 17 is shown mounted on the water cooling tower 14 and a water recirculating pump 18 is mounted on conduit W6 on the water cooling tower 14 at the base thereof. A plurality of water saturated linen curtains 19 are mounted within the water cooling tower 14 so as to receive a stream of air through them from air blower 17. An air outlet 21 allows escape of the moist air circulated through curtains 19 of cooling tower 14. The numeral 20 indicates jets positioned within water cooling tower 14 above the linen curtains 19; the conduit W6 interconnects the jets 20 and the base of the water cooling tower 14.

A refrigerant receiver is shown by the numeral 22, the top of receiver is connected to coil 16 by the conduit R4. The numeral 23 indicates a heat exchanger having the coil 24 which is connected to the base of refrigerant receiver 22 by means of the conduit R5.

The numeral 26 designates a refrigerating tank filled with a Prestone water solution remaining liquid at minus thirty degrees C. having within it a pair of high pressure mercury coils 27 and 28. Positioned at the top of the tank is an evaporator coil 29 which is interconnected with the heat exchanger coil 24 by the conduit R6 which is equipped with expansion valve 31. The top end of the evaporator coil 29 is connected to the base of heat exchanger 23 by the conduit R7.

Positioned below the heat exchanger 23 is an absorber 32 which is connected to the heat exchanger 23 by means of the conduit R8.

A second heat exchanger 33 having coil 34 is interconnected at its base with the base of the absorber 32 by the conduit R9 which is equipped with a pressure reduction valve 35. The top end of coil 34 communicates with the absorption refrigerator generator 9 through the conduit R10, and the top of the heat exchanger 33 is connected to the analyzer 11 by the conduit R11. The side of the heat exchanger 33 and the top of the absorber 32 are interconnected by the conduit R12 which is equipped with a liquid circulating pump 36.

The numeral 81 and 81A designate the chambers of the power generating device (shown in outline in FIG. 1). The numeral M1 shows a conduit leaving the side of the chamber 81 of the power generating device and interconnecting the lower end of the high pressure mercury cooling coil 27. Numeral 37 shows a gate valve along the course of conduit M1.

M2 is a conduit interconnecting the top end of high pressure mercury cooling coil 27 with the top of the chamber 81 of the power generating device. A pressure release "by-pass" valve 38 interconnects conduits M1 and M2.

Leaving chamber 81A of the power generating device is conduit M3 which connects the top end of high pressure mercury cooling coil 28 and it too is equipped along its course with a gate valve 39.

M4 is a conduit connecting the bottom end of high pressure mercury cooling coil 28 to the top of chamber 81A of the power generating device. A second pressure release "by-pass" valve 41 interconnects conduits M3 and M4.

The numeral 65 designates the ice storage tank of the mechanical refrigerator (shown in outline in FIG. 1). Within the tank 65 are a pair of high pressure mercury cooling coils 42 and 43. Conduit M5 is an extension of conduit M1 which connects to the lower end of mercury cooling coil 42; conduit M5 is equipped with the gate valve 44. Conduit M6 is an extension of conduit M2 into the top of mercury cooling coil 42.

Conduit M7 is an extension of conduit M3 into the lower end of mercury cooling coil 43, said conduit M7 having gate valve 45 along its course.

Conduit M8 is an extension of conduit M4 into the top end of mercury cooling coil 43.

The numerals 46 and 47 designate high pressure mercury heating coils located in the water cooler 62 of the mechanical refrigerator.

The numerals 46 and 47 designate high pressure mercury heat boosting coils located in the water cooler 71 of the salt water conversion plant. (In FIG. 1 the salt water conversion plant is not shown, only the aforesaid coils to show their interconnection with the components above described.)

Conduit M9 interconnects the base of chamber 81 with the lower end of the mercury heating coil 47; M10 interconnects the top end of the mercury heating coil 47 with the bottom of the mercury heat boosting coil 49; and, the conduit M11 connects the top of said coil 49 with the top of the power generating device and into its chamber 81. Valve 50 is along the course of conduit M11, and pressure release "by-pass" valve 51 interconnects conduits M9 and M11.

Conduit M12 interconnects the base of the chamber 81A of the power generating device with the bottom end of mercury heating coil 46. Gate valve 52 is along the course of conduit M12. Conduit M13 interconnects the top end mercury heating coil 46 and the bottom end of the mercury heat boosting coil 48; whereas, conduit M14 interconnects the top end of the heat boosting coil 48 and the top of the chamber of the power generating device (81A). Pressure release "by-pass" valve 53 connects M12 and M14.

Figure 2:
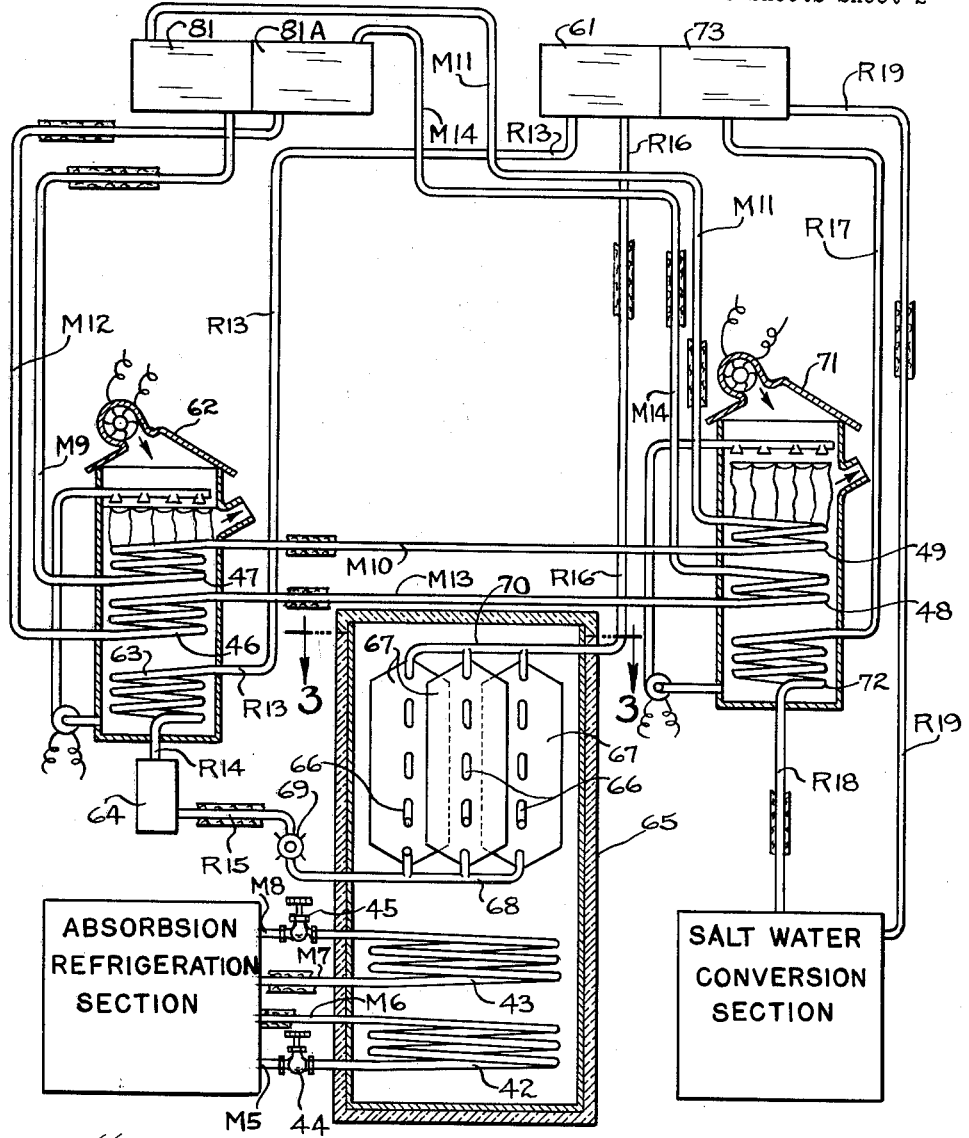
FIGURE 2 is a schematic view of the mechanical refrigerator with the heating circuit in detail and shows it in relation to the water cooler of the salt water conversion section, the power generating device, the compressors thereof and the absorption refrigerator.
Figure 3:
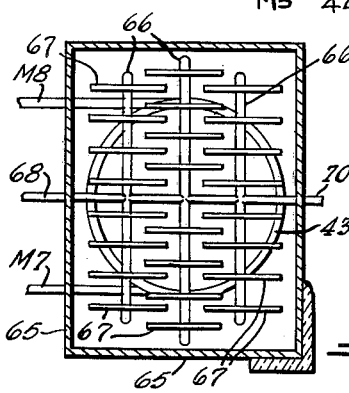
FIGURE 3 is a top sectional view of the ice storage plant of the mechanical refrigerator.

*The mechanical refrigerator ice storage section.*—In the mechanical refrigerator shown in detail in FIG. 2 of the drawings, a refrigerant compressor is depicted by the numeral 61. The numeral 62 shows a second water cooling tower identical with that designated by the numeral 14, it having within it at its base a condenser coil 63, and positioned within it above the condenser coil 63 and submerged in water are the high pressure mercury heating coils 46 and 47 which have heretofore been described. The condenser coil 63 communicates with the refrigerant compressor 61 by means of the conduit R13. A refrigerant receiver 64 is also connected to the condenser coil 63 by the conduit R14.

A heat insulated ice storage tank 65 is shown having within it three evaporator coils each shown by the numeral 66. Each of said coils is equipped with a plurality of cooling fins collectively designated by the numeral 67. A manifold 68 is positioned within the ice storage tank 65 and it communicates with each of the evaporator coils 66. Conduit R15 having an expansion valve 69 connects the manifold 68 with the base of the refrigerant receiver 64.

Also positioned within the ice storage tank 65 are the high pressure mercury cooling coils, 42 and 43 heretofore described. Also located in the ice storage tank 65 is a second manifold 70 which provides a connection between refrigerant compressor 61 and the evaporator coils 66 in conjunction with conduit R16.

The numeral 71 indicates a third water cooling tower to serve the salt water conversion section and which is identical with water cooler of the absorption refrigerator designated by the numeral 14, and also water cooler of the mechanical refrigerator shown by the numeral 62, in the water cooling tower 71 submerged in water are the above mentioned high pressure mercury heat boosting coils 48 and 49. Positioned at the base of this water cooling tower 71 is a condenser coil 72, the top end which is connected to a second refrigerant compressor (depicted by numeral 73 in FIG. 2) by means of conduit R17. The bottom end of condenser coil 72 is connected to the conversion plant (in a manner to be later described) by means of conduit R18. Conduit R19 is shown in FIG. 2 leaving the salt water conversion section of the plant and entering the second refrigerant compressor 73.

*The power generating device.*—In the power generating device shown in the drawings FIG. 4, the parts thereof are defined as follows:

The numerals 81 and 81A designate high pressure chambers having one end closed, 82 and 82A, and the opposite ends, 83 and 83A, thereof being fixed adjacent one to the other; said ends 83 and 83A form an open cylinder 84 which intercommunicates between the high pressure chambers 81 and 81A.

The numeral 85 indicates a piston rod extending through longitudinal axis of the chambers 81 and 81A and the cylinder 84; concentrically fixed on the piston rod 85 and positioned within the cylinder 84 is a piston 86. Also concentrically fixed on the piston rod and positioned within chamber 81 is a collar 87 and a second collar 88 which is positioned on said piston rod 85 at a point between the collar 87 and the closed end 82 of chamber 81. The numeral 87A is a collar concentrically fixed on piston rod 85 within chamber 81A and numeral 88A is a collar concentrically fixed on said piston rod at a point between collar 87A and the closed end 82A of the chamber 81A.

The numeral 89 indicates a tubular heating grid mounted within chamber 81.

The numeral 90 designates a baffle plate mounted within chamber 81 at a declining angle. Said baffle plate is non-metallic in material, and the uppermost face of said baffle plate contain a series of diagonal grooves more particularly shown in FIG. 7. The numeral 91 designates a baffle plate identical to 90 which is positioned in a reversed declining angle within chamber 81 at a point below the baffle plate 90 so that the grooves of the baffle plate 91 will receive a liquid flowing from grooves of baffle plate 90. The numeral 92 is an identical baffle plate to that of 90 and 91 and it also is positioned at a reverse declining angle to that of baffle plate 91 at a point below the baffle plate 91 with its grooves positioned to receive a liquid flowing from the grooves of baffle plate 91.

The numerals 90A, 91A and 92A designate baffle plates positioned within chamber 81A in the same manner as baffle plates 90, 91, and 92 are positioned within chamber 81.

The numeral 94 designates a series of identical spray heads which are mounted to the uppermost wall of chamber 81 directly above baffle plate 90.

Referring to FIG. 5, the numeral 95 indicates a second series of identical spray heads mounted to the uppermost wall of chamber 81 directly above baffle plate 90.

The chamber 81A contains spray head series 94A and 95A (FIGURE 6) which are fixed and positioned in said chamber in a manner identical to the spray head series 94 and 95 respectively.

Positioned within the chamber 81 are mercury pumps 96 and 97. Said pumps are located within the chamber 81 adjacent to the lowermost portion of the wall thereof. A detailed description of the construction and operation of said pumps may be had by reference to the Letters Patent above referred to. The numeral 98 indicates a common piston rod for the pumps 96 and 97 and said piston rod 98 is common to the piston 99 in pump 96 and the piston 100 in pump 97. Slidably mounted on the piston rod 98 are the collars 101 and 102. Concentrically mounted on the piston rod between the collar 101 and the piston 99 is a compression coil spring 103 and similarly mounted on the piston rod 98 between the collar 102 and the piston 100 is a second compression spring 104. Pivotally mounted to the top of chamber 81 is an elongated yoke lever 105 the arms of which span the piston rod 85 and the pump piston rod 98 so that said elongated yoke lever is actuated by the collars 87 and 88 of the piston rod 85 so as to force said yoke lever against the collars 101 and 102 of the pump piston rod 98.

Identically mounted within the chamber 81A are mercury pumps 96A and 97A, pump piston rod 98A which is common to pistons 99A and 100A; collars 101A and 102A and compression springs 103A and 104A; and yoke lever 105A.

As shown in FIGURE 5, the mercury conduit M2 is connected to spray head series 94 by means of the manifold 106 shown in FIGURE 4 and 5, spray head series 95 is connected to conduit M11 by means of a manifold 148 FIG. 5.

As shown in FIGURE 6, spray head series 94A is connected to conduit M4 by means of manifold 106A shown in FIGURE 4 and 6, and spray head series 95A is connected to conduit M14 by means of manifold 148A, FIG. 6.

The numerals 107 and 107A, FIG. 4, indicate mercury filler caps in manifold 106 and 106A. Similar caps 108 and 108A are shown in FIGURE 5 and FIGURE 6 with respect to the spray head series 95 and 95A and the manifolds 148 and 148A serving same.

The numerals 270 and 270A indicate water filler caps in chamber 81 and 81A.

As shown in FIGURE 4, the mercury conduit M1 serves mercury pump 96; conduit M9 mercury pump 97; conduit M12 mercury pump 96A and conduit M3 serves mercury pump 97A.

Referring to FIGURE 5, the numeral 110 indicates a flat plate solar heat collector having within it copper coil 111, the lower end of which is connected to heating grid 89 by means of conduit W7; the upper end of coil 111 is connected to the opposite end of said heating grid 89 by means of conduit W8 which has along its course a small water boiler 112 to receive heat from alternative heat source, burner 113; also, along the course of conduit W8 is gate valve 114. Said conduit W8 is equipped with expansion tank 115 having pressure relief valve 116.

*The Trasnmission System.*—In the transmission system shown in the drawings, the parts are defined as follows:

The numeral 126 designates a rack which is an extension of piston rod 85. The rack 126 is supported by the rack guides 127. The numeral 128 (FIGURE 8) indicates a crank shaft. Concentrically fixed to the crank shaft between the crank throws is a drive pinion 131 which is mounted to communicate with the teeth of the rack 126 and to rotate with the thrust of the rack 126. The numeral 132 indicates a connecting rod connecting the crank shaft 128 and the piston rod 133, which serves as a common piston rod for the refrigerant compressor 61 and the second refrigerant compressor 73. The cylinder of each of said compressors is equipped with a piston 135 and 136. And communicating with each cylinder is a pair of exhaust valves 137 and a pair of intake valves 138 with respect to compressor 61; 139 indicated the exhaust valves of compressor 73 and 140 indicating the intake valves of compressor 73.

In FIGURE 8, a double acting air pump 143 with its connecting rod 141 is connected to crank shaft 128 and air pump piston rod 142. An air tank 144 having water drain 146, is connected to the exhaust of air pump 143 by conduit A1. Conduit A2 extends from the air tank 144 to the salt water conversion section, said conduit having a flow control valve 145 along its course.

*Hydro electric generator.*—In the hydro-electric generator shown in the drawings, the parts thereof are defined as follows:

The numerals 150 designates a double acting water pump, having two intake valves, 151 and two exhaust valves, 152. The pump chamber 153, contains a piston 154 fixed to the end of the piston rod 155 which piston rod is an extension of the piston rod 85 of the power generating device.

The numeral 156 designates an outlet manifold interconnecting the two outlet valves 152 and the numeral 157 indicates an intake manifold interconnecting the two intake valves 151.

The numeral 158 designates a surge tank having a pressure relief valve 161 which is interconnected with the outlet manifold 156 by means of the conduit W9. The numeral 159 indicates a turbine electric generator interconnected with the surge tank outlet 158 by means of the conduit W10.

The numeral 160 indicates a water reservoir which is interconnected with the outlet of the turbine electric generator by a tail race 161, and the numeral W11 designates a pipe interconnecting said water reservoir 160 with the intake manifold 157.

The numeral 162 shows a storage battery (in symbolic form) connected to the positive side of generator 159 with knife switches 163 and 164. The numeral 165 designates a ground leading from generator 159.

*Salt water conversion plant.*—The salt water conversion plant shown in the drawings, FIG. 9, the parts thereof are defined as follows;

The numeral 201 indicates salt water intake pump, which receives salt water through the conduit SW1. The numeral 202 indicates insulated heat exchanger tank containing a heat exchanger coil 203, the bottom end of which is connected to the salt water intake pump 201 by the conduit SW2.

A second insulated heat exchanger tank is shown by the numeral 204, this tank contains two cooling coils, 205 and 206. The numeral 207 designates a float actuated toggle switch which intercommunicates with the chamber of the heat exchanger tank 204. SW3 indicates a conduit interconnecting the interior of the heat exchanger tank 204 and the top of the coil 203.

The numerals 208 and 208A indicate a pair of identical heat insulated freezing tanks.

In each freezing tank (208–208A) is a fresh water manifold equipped with water jets, said manifold is designated by the numeral 209 (209A). An insulated freezing tank cover 210 (210A) equipped with three float actuated toggle switches, 211 (211A), 212, (212A) and 213 (213A) in such manner os that the floats of said switches extend through the cover 210 (210A) and into the chamber of freezing tank 208 (208A).

SW4 (SW4A) indicates heat insulated conduits interconnecting the bottom interior of heat exchanger tank 204 and the chamber of the freezing tanks 208 (208A) through the freezing tank covers 210 (210A). Along the course of said conduit SW4 (SW4A) is a water pump 214 (214A). Fragments of heat insulation shown on said conduits.

The numeral 215 indicates a third insulated heat exchanger tank positioned above the second heat exchanger tank 204. Said third heat exchanger tank contains a lower cooling coil 216 and an upper cooling coil 217.

Interconnecting the base of the upper cooling coil 217 and the freezing tank chamber 208 through the freezing tank cover 210 is the conduit FW1 said conduit FW1 having along its course a solenoid valve 218.

The numeral FW1A designates a conduit interconnecting the base of the lower heat exchanger coil 216 with the chamber of the freezing tank 208A, said conduit having along its course a solenoid valve 218A.

The numeral 219 a fresh water tank positioned above the third heat exchanger tank 215. Said fresh water tank 219 is equipped with a sight guage glass 220.

The numeral FW2 indicates a conduit interconnecting the top of the upper heat exchanger coil 217 with the base of the fresh water tank 219, and the numeral 221 shows a water pump positioned in the conduit FW2. The numeral FW2A indicates a conduit interconnecting the top of heat exchanger coil 216 with the base of the fresh water tank 219 and said conduit having along its course a water pump 221A.

The numeral FW3 indicates a fresh water supply conduit entering the top of fresh water tank 219. Said fresh water supply conduit is equipped with a gate valve, 222.

The numeral 223 shows an air vent pipe entering the top of the fresh water tank 219.

The numeral 224 designates a fresh water storage tank located below the fresh water tank 219 and interconnected with the side thereof by means of the overflow conduit FW4. The numeral FW5 indicates a fresh water supply conduit leaving the fresh water supply tank 224.

The numeral FW6 indicates a conduit interconnecting the upper portion of the chamber of the fresh water tank 219 with the base of the chamber of the freezing tank 208 said conduit being equipped along its course with a solenoid valve 225. The numeral FW6A shows an identical conduit having solenoid valve 225A and similarly interconnecting the fresh water tank 219 and the freezing tank 208A.

The numeral SW5 indicates a conduit interconnecting the side of the chamber of the third heat exchanger tank 215 with the base of the chamber of freezing tank 208 said conduit being equipped with solenoid valve 226. The numeral SW5A indicates an identical conduit having solenoid valve 226A and similarly interconnecting freezing tank 208A and third heat exchanger tank 215. The numeral SW6 indicates an air vented overflow conduit interconnecting third heat exchanger chamber 215 and the top of the chamber of the first heat exchanger 202.

The numeral SW7 shows a conduit interconnecting the chamber of the second heat exchanger 204 and the freezing tank 208, said conduit having along its course solenoid valve 227. A similar conduit SW7A with a similar solenoid valve 227A interconnects second heat exchanger 204 with the freezing tank 208A.

Positioned within freezing tanks 208 and 208A are a series of combination evaporator and condenser coils; 228 and 228A; said series of coils 228 are connected to the top end of the second heat exchanger cooling coil 205 by the conduit R20 and the manifold 229; a similar conduit R20A interconnects series of coils 228A with the second heat exchanger cooling coil 206 by means of the manifold 229A.

The numeral 230 designates a refrigerant receiver positioned below freezing tanks 208 and 208A. Interconnecting the bottom of receiver 230 and the bottom end of the series of coils 228 by means of the manifold 231 is the conduit R21. This conduit R21 passes through solenoid actuated valve 232 in the manner shown, and said conduit has a refrigerant expansion valve 233 along its course.

R22 indicates a conduit interconnecting refrigerant receiver 230 and the bottom end of the series of coils 228A by means of the manifold 231A. Said conduit R22 passes through solenoid actuated valve 234 in the manner shown.

R23 indicates a conduit interconnecting conduit R21 with solenoid actuated valve 234; R24 indicates a conduit interconnecting conduit R22 with solenoid actuated valve 232, said conduit has expansion valve 233A along its course.

The numerals 235 and 235A designate a series of cooling and heating fins fixed to and positioned around coil series 228 and 228A respectively.

The numerals 236 and 236A designate a fine mesh screen positioned at the base of freezing tanks 208 and 208A respectively.

The numerals 237 and 237A indicate air jet manifolds located in the base of freezing tanks 208 and 208A respectively which are connected to air conduit A2 by the air conduits A3 and A3A respectively.

Refrigerant conduit R18 passes through solenoid valve 238 and intersects refrigerant conduit R20A;

Refrigerant conduit R19 passes through solenoid valve 239 and connects the bottom end of the cooling coil 205 in the second heat exchanger 204.

Refrigerant conduit R24 extends between solenoid valve 239 and the bottom end of cooling coil 206 of heat exchanger 204.

Refrigerant conduit R25 interconnects solenoid valve 238 and refrigerant conduit R20.

Numerals 240 designate the solenoid coils for solenoid valves 238 and 239; and 241 designates solenoid coils for solenoid valves 232 and 234.

Numeral 242 is a linkage between solenoid valves 238 and 239 and solenoid coils 240; 243 is a similar linkage between solenoid valves 234 and 232 and solenoid coils 241.

*The timer.*—The timer system serves to control and actuate the various valves and pumps in the salt water conversion plant. In FIGURE 11, FIGURE 12, FIGURE 13 and FIGURE 14 of the drawings, the numeral 250 designates an electric clock motor. Engaging the shaft of the motor 250 is a reduction gear train 251. The numeral 252 designates a plurality of consecutive non-metallic cam discs which are concentrically mounted on the drive shaft 253 which engages the gear train 251, said consecutive cam discs 252 are connected to the drive shaft 253 by a friction bearing 257 FIG. 12. Positioned parallel with the drive shaft spaced from the periphery of said cam discs 252 is a positively charged bus bar 254 which is interconnected with the knife switch 164 (FIGURE 4) leading from the battery 162, by means of the wire 256 FIG. 11. A plurality of breaker point contacts 255 shown on FIG. 11, FIG. 12, and FIG. 13 and designated by the numerals 255A, 255B, 255C through 255N and 255P on FIG. 14 are fastened to the bus bar 254 but insulated therefrom. Each breaker point closing circuit, serves a solenoid actuated valve or a water pump.

*Filling operation of heat transfer mercury system and power generating device.*—Mercury is poured through filler holes 270 and 270A into chambers 81 and 81A to level of dotted line designated X. Mercury pumps 96, 97, 96A and 97A of power generating device are thus submerged in mercury.

The mercury flowing by gravity through conduits designated "M," fills high pressure coils 27 and 28 in refrigerator tank 26 of absorption refrigerator FIG. 1, coils 42 and 43 in ice storage tank 65, FIGS. 1 and 2, coils 46 and 47 in water cooler 62 of ice making refrigerator and coils 48 and 49 in water cooler 71 of mechanical refrigerator of salt water conversion section and fills all interconnecting said conduits.

The piston 86 FIG. 4 is manually moved to the end of cylinder 84 extending within chamber 81 by applying external force to the transmission rack 126. Thereafter chamber 81 is filled, above mercury level, to capacity, with water and filler hole 270 is sealed.

Check valves in mercury pumps 96, 97, 96A and 97A, described in aforementioned Letters Patent, prevent water back flowing into spray heads of series 94, 95, 94A and 95A.

Mercury is now poured in filler holes 107 and 108, FIG. 5, filling the empty space, above dotted line X, in the conduits M2 and M11. Filling manifolds 106 and 148 and spray head series 94 and 95 to capacity. Filler caps 107 and 108 are replaced, sealing mercury system of chamber 81.

The piston 86 is now moved manually in opposite direction, as heretofore described, the length of cylinder 84 to the end of said cylinder extending within chamber 81A. The movement of piston 86 creates a partial vacuum, about ten percent by volume, in chamber 81 and cylinder 84. The chamber 81A is filled to capacity with water and sealed at filler hole 270A.

Mercury is now poured through filler holes 107A and 108A, FIG. 6, filling to capacity conduits M4 and M14, spray head series 94A and 95A and manifolds 106A and 148A. Filler caps 107A and 108A are replaced, sealing mercury system of chamber 81A.

The manually applied external force to rack 126 is removed and piston 86 returns to a central position in cylinder 84, due to the opposed vacuum forces, leaving about 5 percent, by volume, partial vacuum in each chamber 81 and 81A.

*Priming operation of power generating device.*—By any acceptable means, preferably by the operating absorption refrigerator, the temperature of the water within chambers 81 and 81A is reduced to minus two degrees centigrade. This temperature is in the operating range of temperature of the power generating device. The preferred temperature range being from minus one to minus 4 degrees C.

Adaptable means for cooling the water is provided in the Letters Patent above referred to and means for cooling the water is therefore not included herein.

As the heat of fusion is withdrawn from water in both chambers 81 and 81A, ice forms. The greater volume of ice fills the former five percent partial vacuums in each said chamber. The limited volume of the chambers prevents further change of state from water to ice and pressure builds up above 4000 pounds per inch. This pressure is above the pressure needed to melt ice at minus two degrees centigrade and the ice that formed at first of heat of fusion withdrawal is remelted by the pressure as the remaining heat of fusion is drawn off.

This pressurized subcooled water possessing the physical attributes of sensitivity to slight temperature change and relatively great expansion and compression, not possessed by regular water, will hereinafter be called "the working substance."

*Absorption refrigeration.*—The solar operated absorption refrigerator employs solar energy concentrated by the equatorial mounted solar heat concentrator 1 and gathered by flat plate heat collector 3 or operated by conventional gas burner 2, FIG. 1, to refrigerate the high pressure mercury coils 27 and 28 contained within the refrigeration tank 26. This is done by means of the evaporation coil 29 in refrigerating tank 26. This tank is filled with a Prestone water solution which will remain liquid at minus 15 degrees centigrade and hence the mercury in the coils 27 and 28 is reduced to that temperature by surrounding said solution. The inner operation of the absorption refrigerator is well known in the art of refrigeration, hence a detailed explanation thereof will not be made herein.

*First power stroke of power generating device.*—The working substance in the two chambers 81 and 81A at minus 2 degrees C. are thrown out of thermal balance by heating the grid 89 FIG. 5 which is within the chamber 81. This is performed by opening gate valve 114 circulating a small amount of hot water from heat collector coil 111 or boiler 112 through conduits W8 and W7 to said grid 89. This heat reduces the pressure of working substance in chamber 81 causing the piston 86 to move in the cylinder 84 into the warmer working substance in chamber 81. At end of stroke the valve 114 is closed. Mercury pumps 97 and 96A furnish heat to working substance during operation of power generating device.

*The second power stroke.*—The first stroke of piston 86 brings the collar 87 in contact with the yoke lever 105 and actuates said lever so as to compress the coil spring 103 thus forcing the pump piston 99 in pump 96 to move internally into the pump cylinder, thus forcing some mercury at minus 3 degrees C. from mercury pool in chamber 81 through conduit M1 into high pressure mercury cooling coil 27, FIG. 1, which in turn forces some of the precooled to minus 15 degrees centigrade or more, mercury out of coil 27 through conduit M2, FIGS. 1 and 4, and down through spray heads of spray head series 94. The colder mercury mechanically forced from the spray heads into working substance is broken into fine mist like droplets which fall upon baffle plate 90, then on to baffle plate 91 and on to baffle plate 92 the mercury passing through the working substance causes the same to be instantly cooled 1 degree or more centigrade, thus increasing the pressure in chamber 81 2000 lbs, or more per square inch.

Simultaneously with the action described immediately above, a reciprocal action and effect is accomplished in chamber 81A by decreasing the pressure therein 2,000 lbs. or more per square inch. The collar 88A engaged the yoke lever 105A which causes spring 103A to compress and force the pump piston 99A in pump 96A to move internally into the pump cylinder thus forcing some mercury at minus 3 degrees centigrade from mercury pool in said chamber through conduit M12, FIGS. 1, 2 and 4 into high pressure mercury heating coil 46 in water cooler 62, FIG. 2, of mechanical refrigerator thus forcing some preheated mercury at plus 12 or more degrees C. out of the heating coil 46 through the conduit M13 into heat booster coil 48 in water cooler 71 of the salt water conversion section and forcing some of the preheated mercury at 15 or more degrees C. from said heat booster coil 48 through conduit M14 and through spray head series 95A, FIG. 6, thus causing the heated mercury droplets to pass through the working substance in chamber 81A in the manner above described. Thus instantly heating the working substance one or more degrees centigrade in said chamber, and thereby reducing the pressure within said chamber 2,000 pounds per inch or more. Thus by this simultaneous cooling of working substance in chamber 81 and heating of working substance in chamber 81A, the piston is caused to move toward and into warmer working substance in chamber 81A with a free working pressure of at least 2,000 lbs. per square inch, for the entire length of the power stroke.

During the second power stroke, the yoke levers 105 and 105A actuate mercury pumps 97 and 97A.

Pump 97 forces mercury at minus 3 degrees centigrade from mercury pool in chamber 81 through conduit M9 and into preheated mercury filled heating coil 47 in water cooler 62, FIG. 2, forcing some of the preheated mercury at plus 12 or more degrees C. through conduit M10 into the heat booster coil 49 in water cooler 71, the preheated mercury in coil 49 is forced through conduit M11 and through spray heads 95 into working substance in chamber 81, FIG. 5, and in the manner above described heated mercury droplets instantly heat the working substance in chamber 81 at least one degree centigrade thus reducing the pressure 2,000 pounds or more per square inch.

Simultaneously, pump 97A causes the mercury at minus 3 degrees centigrade in chamber 81A to be forced from mercury pool in said chamber through conduit M3, FIGS. 1 and 4, into high pressure mercury coil 28 in refrigerating tank 26 from where some of the pre cooled mercury at minus 15 or more degrees centigrade is forced through conduit M4 through spray heads of spray head series 94A where the cool mercury droplets are caused to pass through the working substance in chamber 81A in the manner above described thus cooling the temperature of the working substance in said chamber at least one degree centigrade and thereby increasing the pressure in said chamber at least 2,000 lbs. per square inch, and the piston is moved back into working substance of chamber 81 under a free working pressure of at least 2,000 lbs. per square inch.

Thus the reciprocal action of the piston continues.

Dependent on the temperature differential between the two working substances in chambers 81 and 81A, the pressure differential between the two chambers during operation is 2,000 lbs. per square inch or more for each degree C. differential in temperature.

The reciprocating action of the piston 86 places into operation the two refrigerant compressors 61 and 73 and the hydroelectric generator in a manner which is obvious from the foregoing description and the drawings. Also it pumps air from compressor 143, FIG. 8, into air tank 144 to be used by the salt water conversion system.

Referring to FIG. 14 the electricity furnished by the hydroelectric generator 159 serves to charge battery 162. The current flows through closed knife switch 164 to operate the electric clock 250 of the timer which is synchronized to operate the various pumps solenoid valves and switches in the salt water conversion system of the plant.

Figure 9:
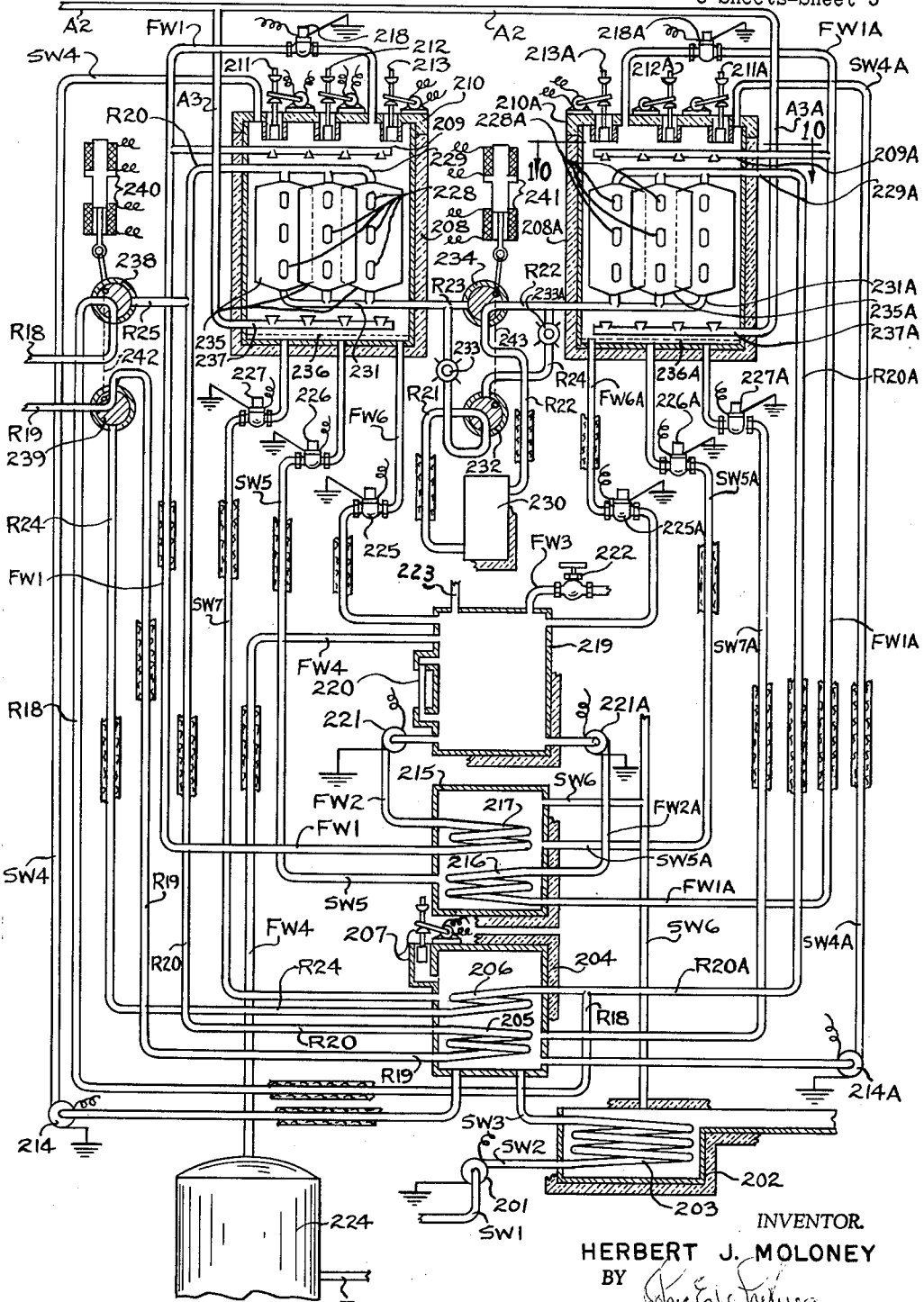
FIGURE 9 is a schematic drawing of the salt water conversion section of the plant with certain elements thereof viewed in section.

Electricity is also furnished by battery, through closed knife switch 163, to air blowers 17 and water pumps 18 of the evaporative water coolers 14, FIG. 1, and 62 and 71, FIG. 2, and to operate salt water pump 201, FIG. 9.

*Mechanical refrigerator and ice storage section.*—Ice storage tank 65, FIG. 2, is filled with water containing enough salt to depress the freezing point of the water to minus five degrees C.

Operating compressor 61 compresses refrigerant vapor through conduit R13 into condenser coil 63 in water cooler 62. Placed above condenser coil 63 and submerged in water are two mercury high pressure coils 46 and 47. Refrigerated mercury in said coils is pumped from power generating device chambers 81 and 81A, FIG. 4, at temperature of minus 3 degrees C. and circulating through said coils, rapidly, absorbs heat from condenser coil 63, lowering temperature of same and raising temperature of mercury coils 46 and 47.

The condenser refrigerant flows from condenser coil 63 into refrigerant receiver 64 through conduit R14. Liquid refrigerant is allowed to flow through expansion valve 69 into evaporator coils 66 in tank 65, through interconnecting conduit R15 and lower manifold 68. The boiling liquid refrigerant in coils 66 absorbs the sensible heat and then the heat of fusion after the brine temperature is reduced to minus five degrees C., causing ice to form on coils 66 and fins 67. Cool refrigerant vapor is returned to compressor 61 from coils 66 through upper manifold 70 and interconnecting conduit R16, to be recirculated by compressor 61. As ice continues to form on said coils, and fins in tank 65, the salt is separated from the water forming the ice, thus making the salt content of the brine more concentrated, thus lowering the temperature of the brine as well as the melting of the ice which has formed.

The volume of tank 65 is relatively large. Thus, allowing a large amount of ice to form on said coils and fins before the melting point of ice is reduced to minus 15 degrees C. by the enriched brine.

The high pressure mercury coils 42 and 43 in lower section of tank 64 are cooled by the surrounding cold brine, to minus fifteen or more degrees C.

The operation of the ice storage section and high pressure mercury coils 42 and 43 in conjunction with the heretofore described power generating device are. The working substance in chambers 81 and 81A of the operating power generating device FIG. 4, is supplied with refrigerated mercury, at minus 15 or more degrees C. from high pressure mercury coils 27 and 28 in refrigeration tank 26 of solar operated absorption refrigerator, FIG. 1. In late afternoon when solar heat is no longer available absorption refrigerator can be placed out of operation and gate valves 37 and 39 on coils 27 and 28 are closed. Gate valves 44 and 45 on coils 42 and 43 are opened. Thus the pumped mercury, from the power generating device, at minus three degrees C. is prevented from circulating through coils 27 and 28 and flows through extended conduits M5, M6, M7 and M8, FIG. 1, circulating through high pressure mercury coils 42 and 43 in ice storage tank 65, FIGS. 1 and 2. The circulating mercury in passing through said coils is reduced in temperature from minus three to minus 15 or more degrees C. The said coils supplying the needed refrigeration to the operating power generating device.

The heat transferred from coils 42 and 43, to colder brine in tank 65 reduces temperature of mercury in said coils from minus three to minus fifteen or more degrees C. This heat is absorbed by the evaporator coils 66 of the operating mechanical refrigerator or absorbed by the stored ice as heat of fusion.

The heat of vaporization absorbed by the refrigerant in evaporator coils 66, and transferred from condenser coil 63 to the high pressure mercury coils 46 and 47, in water cooler 62, contains more low level heat than is required by the operating power generating device. The excess heat is wasted to air by the air blower on heretofore described water cooler 62, the refrigerated mercury in coils 46 and 47 at minus three degrees C. being pumped from the power generating device and circulated through said coils in the evaporative water cooler 62, lowers the temperature of the condenser coil 63, reducing temperature differential between evaporator and condenser coils 66 and 63 of mechanical refrigerator. Thereby, substantially reducing the horse power requirement of compressor 61.

Gate valves 37, 39, 44, 45, 50 and 52, FIG. 1, control the volume of mercury passing through high pressure coils, thus, preventing over heating and over cooling of the working substance in chambers 81 and 81A of the power generating device in FIG. 4. The mercury flow being constricted by said partly closed valves is bypassed through the pressure relief by-pass valves 38, 41, 51 and 53 FIG. 1.

*Heat transferring mercury system.*—In initial priming operation of the power generating device and the creating of the working substance therein, the temperature of the chambers 81 and 81A, FIG. 4, and the mercury pools contained therein, are reduced to minus 3 degrees C., by the solar operated absorption refrigerator, in a manner as described in the heretofore mentioned Letters Patent.

The operating power generating device alternately pumps mercury, through "M" designated conduits, from pools in lower part of said chambers at temperature of minus 3 degrees C., into and through mercury coils 27 and 28 in refrigeration tank 26 of absorption refrigerator, FIG. 1. The reasonably fast exchange of heat from said mercury coils to surrounding Prestone solution in said tank at temperature of minus 15 or more degrees C., quickly lowers temperature of mercury in said coils to minus 15 or more degrees C.

The refrigerated mercury, at minus 15 degrees C., is alternately pumped from said coils to and through the working substance, in a cloud like mist, in said chambers. Instantly exchanging heat, lowering temperature of working substance one or more degrees C., causing power generating device to perform a 2,000 or more pounds per square inch power stroke.

The installation heat exchange from working substance to mercury has raised the temperature of mercury, as it passes through working substance and falls into said pools, from minus 15 to minus 3 degrees C.

Simultaneously, with above described circulation of refrigerated mercury, alternate pumps in said chambers, alternately pump mercury, at minus 3 degrees C., from mercury pools in said chambers, to and through coils 46 and 47 in water filled evaporative cooler 62, of the operating mechanical refrigerator, ice storage section, FIG. 2. In the reasonably fast heat exchange from condenser coil 63 to mercury in said coils 46 and 47 the temperature of mercury is increased from minus 3 degrees C. to plus 10 degrees C.

During the heat exchange the temperature of the condenser coil 63 is substantially reduced. Thereby, reducing condensing pressure of refrigerant therein, reducing mechanical power needed to operate compressor 61.

In the heat transfer heretofore described, a substantial amount of refrigeration effect, developed by the solar operated absorption refrigerator, is advantageously returned to the mechanical refrigerator, to make ice.

The low level heat, energy transferred from condenser coil 63 and recovered by the mercury in coils 46 and 47 is used to operate power generating device.

The mercury at plus 10 degrees C. is pumped from said coils 46 and 47, to and through coils 48 and 49 in water filled evaporative cooler 71, of mechanical refrigerator, of salt water conversion section, where a second transfer of low level heat occurs. The temperature of mercury in said coils is increased from plus 10 to plus 15 degrees C. the temperature of condenser coil 72, in said evaporative cooler, is reduced, with advantageous results, as heretofore described.

Low level heat energy contained by the mercury at plus 15 degrees C. is pumped from said coils into and through the working substance. The cloudlike mercury mist instantly raises temperature of working substance one or more degrees C., lowering the pressure of the working substance 2,000 or more pounds per square inch, thus, allowing the cooler working substance in opposite chamber to cause power generating device to perform power stroke.

As mercury passes through the working substance a heat exchange takes place and the temperature of the mercury is reduced from plus 15° C. to minus 3° C.

The solar operated absorption refrigerator, FIG. 1, in operation all day, furnishing required refrigeration to the operating power generating device, FIG. 4, has caused the operating mechanical refrigerator, FIG. 2, to make and store a substantial amount of ice, in storage tank 65.

Late in the day when solar heat is no longer available in sufficient quantity to operate said refrigerator, said mechanical refrigerator serves the double purpose of furnishing refrigeration and low level heat energy, in adequate amount, to operating power generating device.

As heretofore described, the change over from said absorption to said mechanical refrigeration requires the opening of valves 44 and 45 on mercury coils 42 and 43, located in bottom of tank 65, FIG. 2, and the closing of valves 37 and 39 on coils 27 and 28, in said absorption refrigerator.

Mercury at minus 3 degrees C., now flows through the "M" designated conduits from pools in chambers 81 and 81A of said power generating device, by-passing coils 27 and 28, to and through coils 42 and 43. Exchanging heat from said coils to the surrounding colder brine at minus 15 or more degrees C., hence, temperature of mercury in said coils is reduced from minus 3 degrees C. to minus 15 degrees C., and flows from said coils to and through working substance, lowering temperature of same, as heretofore described.

During the heat transfer from said coils 42 and 43 to colder brine in tank 65, the said heat is absorbed by the boiling refrigerant in coils 66 of the operating mechanical refrigerator 61 and the stored ice. In other words, the boiling refrigerant in evaporator coils 66 absorbs the heat of fusion from some of the brine in tank 65, causing a partial change of state, from water to ice. The heat of fusion absorbed by refrigerant is drawn from said coils and pumped by the operating compressor 61 to the condenser coil 63 in evaporative cooler 62. The low level heat energy is now transferred from said condenser coil to the high pressure mercury coils 46 and 47. The heated mercury is pumped from said coils through working substance in power generating device, raising temperature thereof, allowing power stroke to develop. The heated mercury passing through working substance, transferring heat, is reduced in temperature from plus 15 to minus 3 degrees C. The pumped mercury, minus the sensible heat lost to working substance in heat transfer is pumped back to coils 42 and 43 in tank 65. The remaining low level heat energy that mercury contains is transferred to the colder brine in said tank to be re-absorbed by stored ice and refrigerant and re-circulated to power generating device by said compressor.

The heat of vaporization absorbed by refrigerant in coils 66 is in most part transferred from condenser coil 63 to mercury coils 46 and 47. The heat, in excess of heat needed to operate power generating device is dissipated to air by air blower located on evaporative cooler 62.

The method and means of operating the power generating device in conjunction with absorption and mechanical refrigeration and ice storage section, develops unusual efficiency in overall plant, which is used advantageously in salt water conversion.

*Salt water conversion section.*—All conduits and coils inter-connected therewith which are designated "R" are filled with refrigerant vapor or liquid such as ammonia or sulphur dioxide. Conduits designated "FW" are fresh water and the designation "SW" are salt water conduits. Air conduits are designated "A."

To activate the salt water conversion system, the timer, FIG. 11, is placed in operation by closing knife switch 164, FIG. 4. Knife switch 163 is closed which in turn actuates the salt water pump 201, FIG. 9, thus causing salt water to flow from source through the conduits SW1 and SW2 into the coil 203 in heat exchanger tank 202.

From there it passes through conduit SW3 into the interior of heat exchanger 204. When heat exchanger tank 204 is two-thirds full, the pump 201 is shut off by the float actuated toggle switch 207 which breaks the electrical circuit running to pump 201.

The gate valve 222 is manually opened and the tank 219 is half filled with fresh water as shown on the gauge glass 220, then the valve 222 is manually closed.

Water pump 214 is then actuated by the operating timer, thus causing salt water to be pumped from tank 204 through conduit SW4 into freezing tank 208. When the tank is filled to an appropriate level, the float actuated toggle switch 211 opens the circuit shutting off the pump 214 thereby terminating the supply of salt water to the freezing tank 208.

Circuits to fresh water pump 221A and solenoid filler valve 218A are manually closed at breaker points on timer, FIG. 11. The pump 221A pumps cool fresh water from tank 219 to freezing tank 208A, through interconnecting conduit FW2A, coil 216, conduit FW1A, open solenoid filler valve 218A. When tank 208A is filled, float actuated toggle switch 213A breaks circuit to pump 221A, stopping same. The manually closed breaker points on timer are released, allowing points to open circuits to solenoid valve 218A and pump 221A.

The above described manual filling of tank 208A with fresh water is a priming operation used only in original starting of plant.

Air flow control valve 145 on conduit A2, FIG. 8, is opened, allowing compressed air to flow from air tank 144 to freezing tanks 208 and 208A, FIG. 9, through conduits A2, A3 and A3A. The compressed air flows into bottom of said tanks through air jet manifolds 237 and 237A. The air bubbles released at said air jets rise between coils 228 and 228A and fins 235 and 235A, agitating water during freezing and melting operation.

The refrigerant compressor 73, FIG. 2, in operation is pumping hot refrigerant gas into and through conduit R17 and into condenser coil 72 in water cooler 71, thus partially cooling the refrigerant vapor and it leaves the condenser coil 72 through conduit R18 and passes through the first solenoid actuated valve 238, FIG. 9, through conduit R18 into conduit R20A and into the upper manifold 229A in freezing tank 208A. The refrigerant, then passes through the three combination condenser evaporator coils 228A in freezing tank 208A. The refrigerant is now a liquid and is collected in the lower manifold 231A of freezing tank 208A. The liquid refrigerant is forced through R22 into and through the second solenoid actuated valve 234, forced through conduit R22 into the top of the refrigerant receiver 230. Simultaneously, liquid refrigerant flows from bottom of refrigerant receiver 230 through conduit R21 into and through third solenoid actuated valve 232, from where it flows through expansion valve 233, thence the refrigerant flows into the bottom manifold 231 of freezing tank 208 via conduit R23.

The liquid refrigerant then passes from the manifold into the three expansion coils 228, where it boils absorbing heat from the air agitated salt water contained in the freezing tank 208, forming pure ice on the coils 228 and fins 235. The cold refrigerant vapor is drawn through the three coils 228, into and through the upper manifold 229 and through conduit R20 and into the top of the lower cooling coil 205 in heat exchanger tank 204 where it absorbs heat cooling the salt water in tank 204 which surrounds the coils. The refrigerant vapor is then drawn from the bottom of coil 205 into and through conduit R19 and solenoid actuated valve 239, through conduit R19, back to the refrigerant compressor 73 (FIGS. 2 and 4).

After the timer, FIG. 11, has operated for a short interval of time, a timer disc 252, FIG. 13, opens the circuit leading to the timer motor 250 stopping same. While the motor is stopped, the freezing process is continuing in the air agitated salt water in freezing tank 208 forming pure ice crystals on the fins 235 and coils 228, as this happens, the salt particles are frozen, out of the ice. As the remaining strong brine reaches a predetermined density, due to large quanity of ice formed, the float on hydrometer toggle switch 212 actuates switch and starts the timer motor 250.

The timer now actuates and opens solenoid drain valve 226, allowing the cold enriched brine to drain from freezing tank 208, through screen 236, to heat exchanger tank 215, through conduit SW5. The overflow of tank 215 drains to heat exchanger tank 202, through air vented interconnecting conduit SW6. The cool strong brine absorbing heat from coil 203 before it flows to waste. Freezing tank 208 completely drained of cold enriched brine, solenoid drain valves 226 is closed by timer.

When timer actuates solenoid drain valve 226, as described above, the solenoid drain valve 225A is simultaneously, manually opened by closing circuit to it, at timer breaker points. Thus, allowing the warm fresh water to drain from freezing tank 208A back into fresh water tank 219, through interconnecting conduit FW6A.

When tank 208A is empty the manually applied pressure to timer breaker points is removed, causing points to open, breaking circuit. Therefore, allowing solenoid drain valve 225A to close.

The above described manual draining operation of freezing tank 208A takes place only in original starting of plant.

The timer now actuates the fresh water pump 221, the salt water pump 214A and opens solenoid drain valve 227. The pump 221 pumps fresh water from tank 219, through conduit FW2, into and through cooling coil 217 in heat exchanger tank 215 and this precooled fresh water is pumped through conduit FW1, into the upper fresh water manifold 209 and through spray heads thereof upon ice formations in freezing tank 208. Thus, washing the residue of salt from ice and said tank.

The open solenoid drain valve 227, allows the weak brine resulting from the washing in tank 208, to flow through screen 236 and conduit SW7, into interior of heat exchanger tank 204. This cooled weak brine is used to refill freezing tanks 208 or 208A.

The ice washing operation completed, the timer closes solenoid drain valve 227 and opens solenoid filler valve 218, located along the course of conduit FW1, causing tank 208 to rapidly fill between the ice formations therein with fresh water. When tank 208 is full of fresh water, float toggle switch 213 is actuated, stopping the fresh water pump 221. The timer allows solenoid filler valve 218 to close.

Simultaneously, with the above described pump action, pump 214A has filled freezing tank 208A with precooled diluted salt water from heat exchanger tank 204, through conduit SW4. The float actuated toggle switch 211A stopping pump 214A, when tank 208A is full of diluted salt water.

The timer closes for an instant, an electrical circuit to the lower helix coils of solenoids 240 and 241. Thereby, actuating the four solenoid actuated two way valves, by means of solenoids 240 and 241 armatures and connecting linkages 242 and 243.

The ports in valves 238 and 239 are turned in a counter clockwise direction, through an arc of ninety degrees. The ports in valves 232 and 234 are turned in a clockwise direction, through same distance. The change of position of valve ports causes valve 238 to close passage through port from conduits R18 to R18 and opens passage from R18 to R25. Valve 239 closes passage from conduits R19 to R19 and opens passage from R19 to R24. Valve 234 closes pasage from conduits R22 to R22 and opens passage from R22 to R23. Valve 232 closes passage from conduits R21 to R21 and opens passage from R21 to R24.

The change of passage through valve ports causes the ice covered coils 228 in fresh water filled freezing tank 208 to become condenser coils and the coils 228A in salt water filled freezing tank 208A become evaporator coils.

The salt water conversion plant is now primed for complete automatic operation. The timer discs 252, FIG. 13, breaks circuit to timer motor 250 stopping timer.

Operating refrigerant compressor 73, pumping hot refrigerant gas through conduit R17, to and through condenser coil 72 in water cooler 71, FIG. 2, partially cooling the refrigerant vapor which then flows through conduit R18, FIG. 9, through two-way solenoid actuated valve 238, through conduit R25, conduit R20, top manifold 229 into coils 228, in freezing tank 208. The warm refrigerant vapor, thus, furnishing the heat of fusion to melt ice on coils 228 and fins 235.

The condenser liquid refrigerant flows from freezing tank 208, through lower manifold 231 into the upper side of refrigerant receiver 230, through the interconnection conduits R23, R22 and open two-way solenoid actuated valve 234.

Simultaneously, with described condensing and melting operation in freezing tank 208, liquid refrigerant is flowing from lower side of refrigerant receiver 230, through conduit R21, open two-way solenoid actuated valve 232, conduit R24, expansion valve 233A, conduit R22 into lower manifold 231A, in freezing tank 208A. The liquid refrigerant flowing from said manifold into and boiling in coils 228A. The boiling refrigerant absorbing the heat of fusion from the air agitated, dilute, salt water surrounding said coils in tank 208A. Thus, causing pure ice to form on coils 228A and fins 235A. The cold refrigerant vapor is drawn from coils 228A, through upper manifold 229A, conduit R20A into and through coil 206 in heat exchanger tank 204, cooling the surrounding diluted salt water therein. The vapor passes out bottom of coil 206 through conduit R24, open solenoid actuated two-way valve 239 and conduit R19, returning to refrigerant compressor 73, FIG. 2.

Thus, by virtue of the foregoing operation, the heat of fusion withdrawn from freezing salt water in freezing tank 208A is transferred to the ice in freezing tank 208, furnishing the heat of fusion to melt ice.

The ice having formed in sufficient quantity, on coils 228A and fins 235A, in freezing tank 208A, has enriched the remaining brine the amount required to actuate float actuated hydrometer switch 212A, closing circuit to timer motor 250, starting timer, FIG. 11. The operating timer, opens solenoid drain valves 225 and 226A. The open valve 225 drains the fresh water and melted ice water from freezing tank 208 to fresh water tank 219, through screen 236 and conduit FW6. Fresh water in tank 219 overflows to tank 224, through conduit FW4. Conduit FW5, shown broken, interconnects storage tank 224 and service supply conduit.

Simultaneously, with draining of tank 208, the open solenoid drain valve 226A, has allowed the cold enriched brine to drain from freezing tank 208A, into interior of heat exchanger tank 215 through conduit SW5A. The relatively warmer brine in the upper part of tank 215, overflows to heat exchanger tank 202, as heretofore described.

Upon completion of draining operation of freezing tanks 208 and 208A, the operating timer, allows solenoid drain valves 225 and 226A, to close. The closing of solenoid drain valve 225, by the timer, has caused freezing tank 208 to complete first cycle of operation.

The timer closes circuits and starts pumps 214 and 221A and opens drain solenoid valve 227A. The pump 214 pumps diluted precooled salt water from heat exchanger 204 to freezing tank 208, as heretofore described. The fresh water pump 221A, simultaneously, has pumped precooled fresh water from tank 219, through conduit FW2A, through precooling coil 216 in heat exchanger tank 215, through conduit FW1A into spray jet manifold 209A, in tank 208A. The sprayed fresh water washes salt residue from ice and tank interior. The resulting weak brine from washing operation drains from freezing tank 208A, through open solenoid valve 227A, to heat exchanger tank 204, through screen 236A and conduits SW7A, to be reused. The operating timer closes solenoid drain valve 227A and opens solenoid filler valve 218A, allowing the pumped precooled fresh water from tank 219 to rapidly fill space between ice and interior of tank 208A. The float actuated toggle switch 213A, breaks electrical circuit, stopping pump 221A, when said tank is filled. Timer allows solenoid filler valve 218A to close.

Freezing tank 208 filled with precooled dilute salt water and freezing tank 208A filled with precooled fresh water and pure ice, the timer closes circuit, for instant, to the upper coils on solenoids 240 and 241, causing ports through solenoid actuated two-way valves 238, 239, 234 and 232 to turn in a reverse direction from direction heretofore described, through an arc in ninety degrees, causing passages through valve ports to align with conduits shown in drawing, FIG. 9. The change in position of said solenoid actuating valve ports causes coils 228 in tank 208 to become evaporator coils and coils 228A in tank 208A become condenser coils.

A timer disc 252, FIG. 13, breaks circuit to timer motor 250, stopping timer. The timer is always stopped during freezing and melting operation. Pure ice having formed in sufficient quantity on coils 228 and fins 235 in tank 208, as heretofore described, the remaining cold enriched brine, actuates hydrometer toggle switch 212, starting timer motor 250.

Elevated sections on perimeters of revolving discs 252 on operating timer, FIGS. 11 and 12, close circuits at breaker points 255 opening solenoid drain valves 226 and 225A. The open valve 226 drains cold enriched brine from tank 208, and cycle of operation continues as heretofore described. The open solenoid drain valve 225A drains, the coil heated, fresh water and the water of melted ice, from freezing tank 208A to fresh water tank 219, through interconnecting conduit FW6A.

The timer closing solenoid drain valve 225A has completed cycle of operation of freezing tank 208A. Thus, completing cycle of operation of entire salt water conversion plant. The freezing tank 208 and 208A continue to alternate the freezing and melting operation, herein described. The salt water conversion plant continues in automatic operation.

The heat of vaporization absorbed by refrigerant in the heretofore described salt water conversion plant is used in large part as heat of fusion, melting ice. Part of the remaining heat is transferred from condenser coil 72 to the two high pressure mercury coils 48 and 49 in water cooler 71, FIG. 2. The mercury in said coils conveys the low level heat energy to the power generating device to be converted to mechanical energy. The residue heat is dissipated to air by air blower on evaporative water cooler 71.

In summary:

*Efficiency of power generating device.*—Efficiency of power generating device when interconnected with heat transfer means and operating in conjunction with mechanical refrigeration.

*Overall efficiency of salt water conversion plant.*—an example: Chambers 81 and 81A, FIG. 4, each contain five quarts of water. The water in each chamber weighs about ten and one-half pounds.

When priming operation of power generating device is completed and heat of fusion is drawn off from the water in each chamber, a physical change occurs in the water and it becomes the working substance of the power generating device.

One quart of the working substance when compressed at temperature of minus 2 degrees C. weighs 2.086 pounds, its volume is fifty-seven and three-quarter cubic inches and it expands five and one-third cubic inches if allowed full expansion and change of state to ice.

Five quarts of the working substance weighing ten and one-half pounds, expanding in either chamber 81 or 81A, through cylinder 84, against piston 86, the piston area is two square inches, will develop a thirteen inch power stroke with four thousand pounds per sq. in. pressure at temperature of minus 2 degrees C. The thirteen inch stroke is under the maximum stroke of the working substance and maintains the working substance under sufficient pressure to prevent a change of state to ice.

To simultaneously lower the temperature of the ten and one-half pounds of working substance one degree C. in chamber 81 and raise the temperature of the ten and one-half pounds of working substance one degree in chamber 81A requires transfer of about 19 B.t.u. From working substance in chamber 81 to working substance in chamber 81A.

After heat transfer of 19 B.t.u. by mechanical heat pump, the colder working substance at minus 2 degrees C. temperature in chamber 81 expands through cylinder 84 with over 4,000 pounds per sq. in. pressure, forcing piston 86 to end of cylinder 84 within chamber 81A. One-half of the 4,000 pounds per inch pressure is used in compressing the warmer working substance at minus 1 degree C. and 2,000 lbs. per sq. in. pressure in chamber 81A. The balance of over 2,000 lbs. per sq. in. pressure is free energy to do useful work. Therefore, piston 86 with an area of two square inches, performs a 13 in. power stroke with over 4,000 pounds of thrust for length of stroke, doing about 4,333 ft. lbs. of work. Therefore, the conversion of low level heat to work is about 228 ft. lbs. per B.t.u. and the efficiency of the low level heat conversion to mechanical energy is about 29 percent.

4000 lbs. of thrust is furnished throughout the entire length of the stroke providing a 4000 lb. load is placed on the piston rod. The amount of thrust developed is directly proportional to the amount of heat transferred or the temperature differential created between the working substance in chambers 81 and 81A. The amount of heat transferred is directly proportional to the load placed on the piston rod, that is to say, to increase the resistance on piston 86 increases heat transference which will take place.

The power generating device operating at very conservative speed of 31 strokes per mi., with a 4,333 pounds thrust through a distance of thirteen inches develops over four horsepower. This rate of generating mechanical power requires the transferring back and forth of 589 B.t.u. per mi. from the warmer to the colder working substance in chambers 81 and 81A.

Mechanical refrigeration used in conventional manner with condenser temperature of 86 degrees F. and evaporator temperature of 5 degrees F., requires about one horsepower to absorb 200 B.t.u. per mi. However, after the priming operation of the power generating device is completed and enough ice has formed on coils and fins in brine tank of the ice storage tank 65, FIG. 2, to depress the melting point of ice to minus 15 degrees C., the solar operated absorption refrigerator can be placed out of operation. The mechanical refrigerator, now operating at a heat pump, takes over the heat transfer for the power generating device.

The mechanical heat pump as used in conjunction with the power generating device, in contrast, to conventional mechanical refrigeration, returns to condenser coil, after passing through power generating device, the refrigeration effect it creates. Thereby, reducing condenser coil temperature. Thus, reducing refrigerant condensing pressure and horsepower to about one-half the usual amount required to transfer 200 B.t.u. per mi. Therefore, to transfer 600 B.t.u. per mi. to keep power generating device in operation with four horsepower mechanical output will require about one and one-half horsepower to operate heat pump. Thus, a balance of about two and one-half horsepower remains to operate the salt water conversion plant.

The electric generator 159, FIG. 4, of the hydro-electric section, is a thirty amp. 6 volt type. The air pump 143, FIG. 8, is a small volume low pressure type. The mercury pumps 96, 97, 96A and 97A, FIG. 4, are small volume low pressure type. Therefore, one-half horsepower is allocated for operation of electric generator, air pump, mercury pumps, frictional losses, heat leaks and to maintain power generating device temperature of minus 3 degrees C.

The salt water conversion section in operation and having completed the priming operation including the freezing operation in both tanks 208 and 208A, FIG. 9. The three heat exchangers 202, 204 and 215 all primed and in efficient operation. The second mechanical heat pump transfers heat of fusion back and forth from one freezing tank to the other, freezing the salt water and melting the pure ice, creating a very favorable condenser temperature and a correspondingly reduced horsepower requirement of mechanical heat pump to transfer 200 B.t.u. per mi. Therefore, about one-third horsepower transfers 200 B.t.u. per mi. and at this rate of heat transfer, the remaining two horsepower generated by power generating device will transfer about 1,200 B.t.u. per mi., converting sea water to potable water at rate of twelve to fifteen hundred gal. per twenty-four hour day.

The sub-zero C. operating temperature of the power generating device makes available for conversion to mechanical energy the inexhaustable supply of indirect low level solar heat energy stored in water and the air.

The physical nature of the working substance used by the power generating device makes it possible to operate without exhaust heat losses, in contrast, to conventional heat engines. Therefore, the same heat is re-used and transferred back and forth between chambers 81 and 81A, doing useful work, the heat of compression is transfered to power generating device for reconversion to mechanical energy.

In conventional heat engines, fuel temperatures exceeding 2,000 degrees F. are often created and maintained with great heat loss, creating efficiency difficulties. In contrast, the relatively low operating temperature of the working substance of the power generating device, created and maintained by refrigeration, creates no efficiency problem. The very favorable coefficient of performance of mechanical refrigeration, is used to utmost advantage, when the mechanical heat pump, for heat transfer, is interconnected, with heat transferring means, to the power generating device. Thereby, developing unusual overall plant efficiency.

The foregoing description pertains to a preferred embodiment of the invention it is understood that variations as to size, materials, and design may be resorted to without departing from the scope or spirit of this invention.

I claim:

1. A salt water conversion plant comprising, a pair of heat insulated tanks; a first heat exchanger tank intercommunicating with each of said heat insulated tanks through the top thereof, a salt water conduit extending from within each said heat insulated tank to within said first heat exchanger tank and having flow control means along its course, a second heat exchanger tank, a salt water inlet conduit entering said second heat exchanger tank, and coiling therethrough and entering said first heat exchanger tank; refrigerant evaporation and condensation means positioned within each of said heat insulated tanks; ice forming and supporting means fixed to said refrigerant evaporation and condensation means, a reciprocating refrigerant compressor; a refrigerant pre-cooling condenser coil intercommunicating with said refrigerant compressor; refrigerant pre-cooling means positioned in relation to said refrigerant pre-cooling coil so as to cause heat transference therefrom; a first and second cooling coil, each situated within said first heat exchanger tank, one end of each of said first and second refrigerant cooling coils interconnected with said refrigerant compressor and the opposite end of said first cooling coil interconnected with one said refrigerant evaporation and condensation means of one heat insulated tank, the opposite end of said second cooling coil being interconnected with said refrigerant evaporation and condensation means of the other said heat insulated tank, refrigerant expansion valves interconnected with the terminus of each refrigerant evaporation and condensation means; a refrigerant receiver interconnecting and intercommunicating with the termini and refrigerant expansion valves of said refrigerant evaporation and condensation means; refrigerant flow control means connected to said refrigerant conduits so as to reverse the direction of the flow of refrigerant through said refrigerant conduits and receivers; water agitation means positioned within each of said heat insulated tanks; a fresh water tank; a third heat exchanger tank intercommunicating with each said heat insulated tank and having flow control means along the course of intercommunication, said second and third heat exchanger tanks intercommunicating; a pair of fresh water conduits each having water pumping means and each extending from within said fresh water tank through said third heat exchanger tank and into one heat insulated tank; water spray means positioned within each said heat insulated tank and forming the terminus of each of said fresh water conduits; power generating means; first power transmission means interconnecting said refrigerant compressor and said power generating means; and second power transmission means interconnecting said power generating means with said water pumping means and said liquid agitation means.

2. A salt water conversion plant as denfined in claim 1 wherein said power generating means includes a pair of closed chambers; a cylinder having open ends extending into each of said closed chambers; a piston rod extending through said cylinder and said chambers; one end of said piston rod connected to said power transmission means; a piston concentrically fixed to said piston rod and slideably mounted in said cylinder; temperature reduction means interacting on the interior of each said closed chamber; alternating heat transfer means intercommunicating with each of said chambers and said temperature reduction means so as to provide simultaneous and alternating temperature reduction to one said chamber and simultaneous temperature increase to the other said chamber.

3. A salt water conversion plant as defined in claim 2 wherein said temperature reduction means is a separate liquid pump and primary cooling-liquid transmission circuit interconnected with each closed chamber to remove liquid from the base thereof and inject liquid under pressure through the top of its parent chamber; A second refrigerant compressor; power transmission means interconnecting said second refrigerant compressor and said generating means; and an absorption refrigeration in fixed relation to each primary cooling-liquid transmission circuit so as to transfer heat from the contents thereof.

4. A salt water conversion plant as defined in claim 3 wherein said liquid is mercury.

5. A salt water conversion plant as defined in claim 3 wherein said alternating heat transfer means is mechanical refrigerator having ice forming capacity and means interconnected by its refrigerant conduits with said second refrigerant compressor; said refrigerant conduit passing through refrigerant pre-cooling means and, a second separate liquid pump and primary heating-liquid transmission circuit interconnected with each closed chamber to remove liquid from the base thereof and inject liquid through the top of each closed chamber, with each said separate primary heating-liquid transmission circuit juxtaposed with relation to the said refrigerant conduits of said mechanical refrigerator to cause heat transference into each said separate primary heating-liquid transmission circuit, and actuating means interconnecting all said liquid pumps so as the pump of the primary cooling-liquid transmission circuit of one said closed chamber operates simultaneously with the pump of the primary heating-liquid transmission circuit of the other said closed chamber.

6. A salt water conversion plant as defined in claim 5 and including a diversion cooling-liquid transmission circuit, each having a shut off valve, branching from each said separate primary cooling-liquid transmission circuit into said mechanical refrigerator so as to allow heat transference to the ice forming means thereof, and each said diversion cooling-liquid transmission system thence extending through the top of one said closed chamber.

7. A salt water conversion plant as defined in claim 5 wherein each refrigerant pre-cooling means is a liquid conduit coil integral with said each primary and diversion liquid-cooling transmission circuit.

8. A salt water conversion plant as defined in claim 7 wherein said refrigerant flow control means comprises a plurality of valves connected in said refrigerant conduits so as to allow the refrigerant therein to reverse its flow through said refrigerant conduits and expansion valves so as to provide liquid refrigerant passing through the said refrigerant evaporation and condensation means of one said heat insulated tank while refrigerant vapor is passing through the evaporation and condensation means of said other heat insulated tank; valve actuating means connected all said valves to provide reverse and reciprocal flow therethrough.

9. A salt water conversion plant as defined in claim 8 wherein said valve actuating means is a solenoid connected to each said valve; an electric current supply; current breaking means interconnecting said electric current supply and said solenoids.

10. A salt water conversion plant as defined in claim 9 and including solenoid control valves fixed in said fresh water liquid conduits extending into said heat insulated tanks and said liquid conduits extending from said heat insulated tanks; a plurality of float actuated toggle switches positioned in each of said heat insulated tanks interconnecting said solenoid valves with said electric current supply.

11. A salt water conversion plant as defined in claim 9 wherein said electric current breaking means is an electric timer having a plurality of breaker points each of which is connected to a solenoid.

12. A salt water conversion plant as defined in claim 9 and including electric current generating means; power tansmission means interconnecting said electric current generating means and said pitson rod.

13. A salt water conversion plant as defined in claim 9 wherein said power generating means is a hydroelectric generator.

14. A salt water conversion plant as defined in claim 1 wherein said liquid agitation means is an air compressor; transmission means interconnecting said air compressor and said pitson rod; air conduits interconnecting said air compressor with each of said heat insulated tanks.

15. A method of converting salt water to fresh water which comprises the following steps: filling heat insulated tanks with salt water; generating a first force by confining a liquid within a limited volume and reducing the temperature thereof to below its fusion temperature while restraining the expansion thereof with a second force to prevent its solidification and permitting expansion of the liquid by its attempting to solidify; compressing refrigerant by mechanical application of said first force; passing enclosed refrigerant vapor through said salt water while agitating same to cause the freezing thereof; washing the ice thus formed with fresh water; draining the resultant saline solution; melting the ice and draining resulting fresh water.

16. A method of converting salt water into fresh water which comprises the following steps; filling heat insulated tanks with salt water; compressing refrigerant by a force provided by reducing the temperature of a confined liquid to below its fusion temperature by causing heat transference from said confined liquid to a colder substance brought in direct contact with the confined liquid without causing chemical reaction or combination between the two while restraining the expansion of the confined liquid with such force to prevent its solidification; passing enclosed refrigerant vapor through sail salt water while agitating same to cause the freezing thereof; washing the resultant ice with fresh water; draining the resultant saline solution from said tanks; melting the ice and draining the melted ice from said tanks.

17. A method of converting salt water to fresh water which comprises the following steps: filling heat insulated tanks with salt water; compressing refrigerant by a force provided by confining a liquid within a limited volume and reducing the temperature of the confined liquid to below its fusion temperature by inserting a colder second liquid into the confined liquid without causing chemical reaction or combination between the second liquid while restraining the expansion of the confined liquid with sufficient force to prevent its solidification; passing enclosed refrigerant vapor through said salt water while agitating same to cause the freezing thereof; washing the resultant ice with fresh water; draining the resultant saline solution from said tanks; melting the ice and draining the melted ice from said tanks.

18. A method of converting salt water to fresh water which comprises the following steps: filling heat insulated tanks with salt water; compressing refrigerant by a force provided by confining the liquid within a limited volume and reducing the temperature of the confined liquid to below its fusion temperature by inserting a colder second liquid into the confined liquid without causing chemical reaction or combination between the liquids, while restraining the expansion of the confined liquid with sufficient force to prevent its solidification and alternately increasing and reducing the temperature of the confined liquid within a range below its fusion temperature while controlling the volume of the confined liquid sufficient to prevent its solidification by alternately inserting a hotter second liquid and a colder second liquid without causing chemical reaction or combination between the confined liquid and the inserted liquid; passing resultant refrigerant vapor through said salt water while agitating same to cause the freezing thereof; washing the resultant ice with fresh water; draining the resultant saline solution from said tanks; melting the ice and draining the melted ice from said tanks.

References Cited by the Examiner
UNITED STATES PATENTS

| 2,937,507 | 5/60 | Toulmin | 62—123 |
| 2,979,888 | 4/61 | Maloney | 60—23 |
| 3,070,969 | 1/63 | Ashley et al. | 62—124 X |

ROBERT A. O'LEARY, *Primary Examiner.*

UNITED STATES PATENT OFFICE
CERTIFICATE OF CORRECTION

Patent No. 3,159,474                            December 1, 1964

Herbert J. Moloney

It is hereby certified that error appears in the above numbered patent requiring correction and that the said Letters Patent should read as corrected below.

Column 4, line 53, for "46 and 47 designate" read -- 48 and 49 indicate --; column 13, line 10, for "64" read -- 65 --; column 14, line 11, for "installation" read -- instantaneous --; column 17, line 33, for "SW4." read -- SW4A. --; line 70, for "condenser" read -- condensed --; column 18, line 73, for "in" read -- of --; column 19, line 1, for "actuating" read -- actuated --; column 20, line 40, for "at" read -- as --; column 24, line 7, for "sail" read -- said --; line 54, for "Maloney" read -- Moloney --.

Signed and sealed this 13th day of July 1965.

(SEAL)
Attest:

ERNEST W. SWIDER                          EDWARD J. BRENNER
Attesting Officer                              Commissioner of Patents